Nov. 18, 1941.   C. A. CADWELL   2,262,755
RAIL BONDING APPARATUS
Filed Dec. 1, 1938
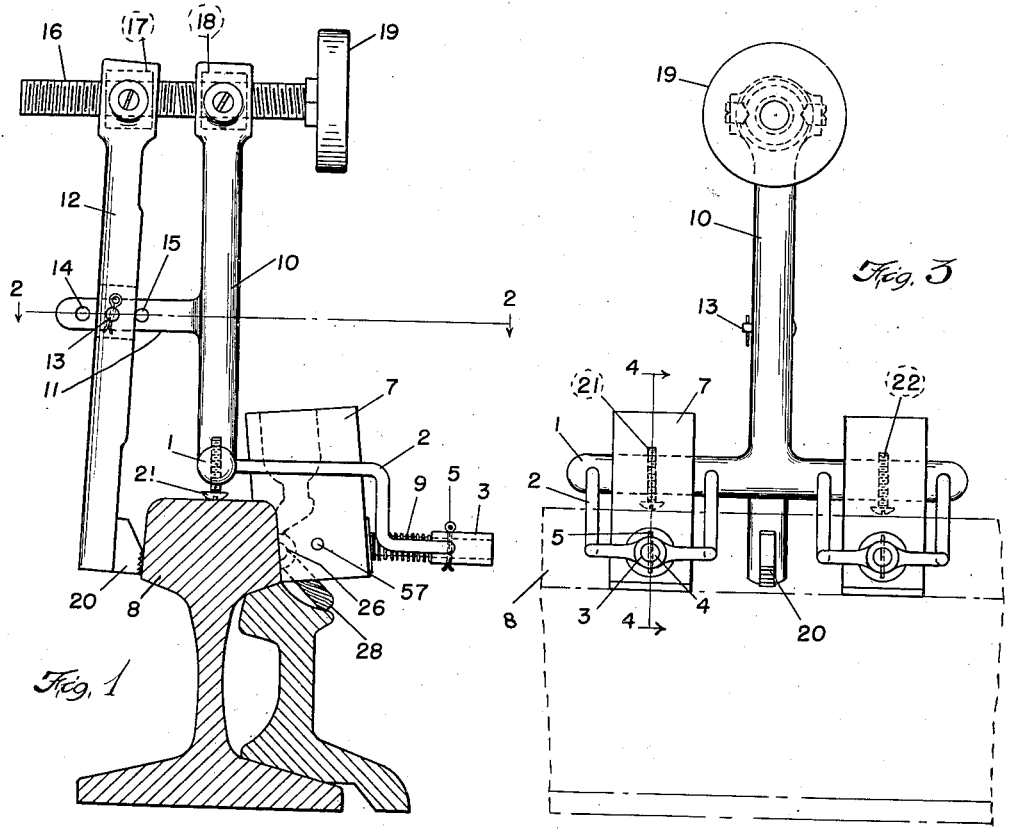
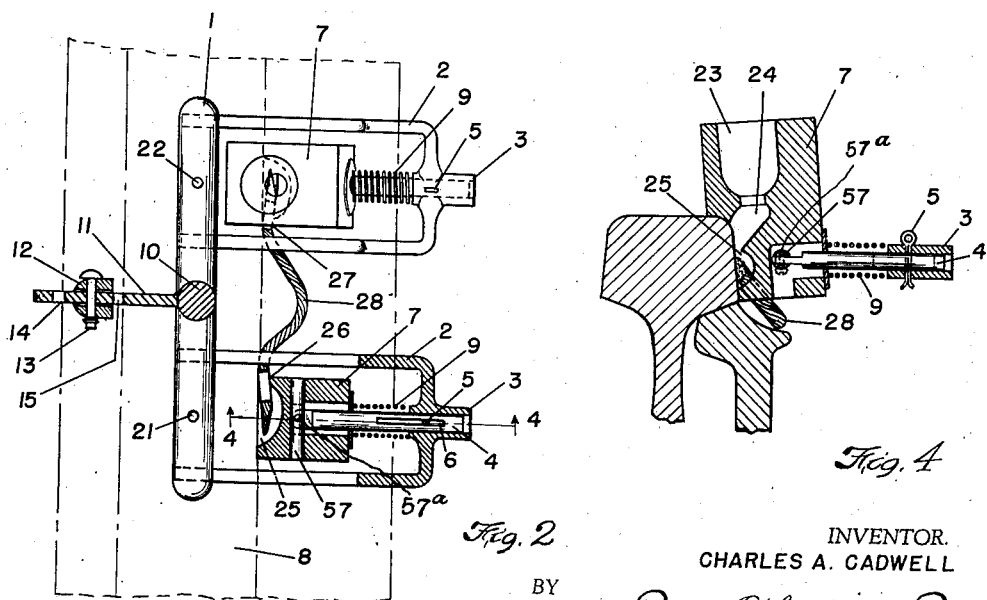
INVENTOR.
CHARLES A. CADWELL
BY Ray, Oberlin & Ray
ATTORNEYS Patented Nov. 18, 1941

2,262,755

UNITED STATES PATENT OFFICE 2,262,755

RAIL BONDING APPARATUS

Charles A. Cadwell, Cleveland Heights, Ohio, assignor to The Electric Railway Improvement Company, Cleveland, Ohio, a corporation of Ohio Application December 1, 1938, Serial No. 243,351

7 Claims. (Cl. 22—116)

This invention relates, as indicated, to rail bonding apparatus, and more particularly to a form of apparatus designed for attaching railway signal conductors to the rails by means of a welding operation wherein the weld metal is produced by exothermic reaction. More specifically, this invention relates to a new and improved apparatus for securing rail bond conductors to rails utilizing the above form of welding operation, to the production of an improved connection, both from the point of view of physical strength and electrical contact.

This application is a continuation in part of my copending application Serial No. 107,051, filed October 22, 1936, and a portion of the subject matter disclosed but not claimed herein is disclosed and claimed in my co-pending application Serial No. 370,015, filed December 13, 1940.

Workers in the prior art have attempted to utilize metal produced by means of exothermic reaction for attaching rail bond conductors to rails, but have not been generally commercially successful, due primarily to the fact that the bond terminals as formed in accordance with prior art practices, have generally been defective, either from the standpoint of mechanical strength or electrical conductivity, or both. Difficulty has been met with in providing a sound bond due to the fact that, generally, a stranded conductor body formed of copper is to be attached to the solid body of the rail formed of steel, one of the elements being a more or less loose bundle of separate wires of relatively high thermal conductivity, and the other member a solid body of considerably lower thermal conductivity. Trouble is also encountered when attempting to bond a conductor composed of steel wire, for example, to a steel rail, although in a lesser degree.

It is, therefore, a principal object of my invention to provide a new and improved device for rail bonding wherein the terminals of the bond may be attached to the body of the rail by means of a weld metal formed from an exothermic reaction, such welded terminal being of good physical strength and electrical conductivity.

It is also an object of my invention to provide an apparatus of the type above defined which will be adaptable for use with various weld metals produced by exothermic reactions, and will also be easily portable and simple of operation. Other objects of my invention will appear as the description proceeds.

To the accomplishment of the foregoing and related ends, said invention then consists of means hereinafter fully described and particularly pointed out in the claims, the annexed drawing and the following description setting forth in detail certain means and one mode illustrating, however, but one of the various ways in which the principle of the invention may be used.

In said annexed drawing:

Fig. 1 is a side elevational view of a preferred form of my new apparatus mounted on a rail and showing the rail in cross-section;

Fig. 2 is a top view of the same apparatus cross-sectioned at 2—2, as indicated in Fig. 1, and showing one of the two molds in cross-section, as well as indicating the position of the rail bond in the molds;

Fig. 3 is a front elevational view of the same apparatus;

Fig. 4 shows a cross-sectional view of one mold along the line 4—4 indicated in Figs. 2 and 3.

This invention comprises a new and improved apparatus for welding bond terminals to rails, such apparatus being of such small size and ease of operation as to be manipulated by relatively unskilled labor. The apparatus of my invention also insures the formation of strong and effective welded bond terminals wherein the weld metal is formed by an exothermic reaction. My apparatus may also be adapted with but slight alteration for use with the various different weld metals which may be produced by exothermic reaction, such as copper and iron.

Referring now more specifically to the drawing, and especially to Figs. 1, 2 and 3, the apparatus illustrated in such figures is, as above indicated, one of the preferred forms of my invention. As illustrated in these figures, the apparatus of my invention comprises a frame piece 1 to which two molds, identical except as to the location of the opening for the bond, are attached. A description of one of such molds, together with its supporting members follows:

An angular frame 2 connected with said frame piece 1 supports a housing 3, in which a rod 4 is slidably mounted by means of a pin 5 through said housing 3 and fitting in a slot 6 in said rod 4. The mold block 7 is tiltably mounted about rectangularly related axes 57 and 57a on the end of said rod 4 adjacent to the rail head 8 by means of a hinge member 57 and held in resilient relation to the housing 3 by means of a spring 9 about said rod 4 and between said mold block 7 and said housing 3.

Midway on said frame piece 1 and midway between the two mold blocks, as shown in Fig. 2, is a fixedly attached upright fulcrum arm 10 having a lateral arm 11 located substantially midway of its length, and on which a second fulcrum arm 12 is pivoted by means of a pin 13, the location of the pivotal point on said lateral arm 11 being adjustable by the optional employment of holes 14 or 15. Extending between the upper ends of the fulcrum arms 10 and 12 is a screw member 16 having oppositely pitched threads at its opposite ends, which are respectively engaged in threaded blocks 17 and 18 pivotally supported on said fulcrum arms 10 and 12.

At the end of the screw member 16 is a hand wheel 19 whereby it may be conveniently rotated in either direction to selectively move the upper ends of the fulcrum arms toward and away from each other and to correspondingly unclamp and clamp the mold block 7 against the face of the rail head. The fulcrum arm 12 is provided with a clamping foot 20 adapted to engage a face of the rail head. The position of the molds against the side of the rail head may be regulated with precision by adjusting the screws 21 and 22 mounted vertically in the frame piece 1.

As illustrated in Fig. 4, the upper half of the mold block 7 is hollowed out to serve as a crucible 23 with a sprue passage 24 in the bottom thereof communicating with the mold cavity proper 25 in which the terminal of the conductor 28 is positioned, such sprue passage being open to the rail-contacting face of the block, and the wall of such passage opposite to such face being inclined toward the latter. It will furthermore be noted that as a result of its form and disposition such sprue passage has a constricted connection with the main cavity of the mold. The two molds differ, as above pointed out, only in the location of the side openings 26 and 27 in which the ends of the conductor 28 are inserted, such openings being located, of course, on the sides of the mold blocks respectively facing each other.

The operation of the apparatus may be briefly described as follows: The frame member 1 is supported upon the rail head 8 by the adjusting screws 21 and 22 which are turned so that the mold block 7 will fit the curve of the rail head when clamped thereto, by rotating the hand wheel 19. The mold block 7 can also tip or oscillate sufficiently about the axes 57 and 57a to adapt itself to the inclination of the rail head. This form of apparatus comprises two molds separated in such spaced relation that the opposite ends of the rail bond 28 may be simultaneously clamped in the respective mold cavities and in such position welded to the rail head 8. A metal plug or gate is then placed in the bottom of the crucible proper 23, closing off the sprue opening 24, and the exothermic charge is placed in said crucible. Upon being ignited, said charge reacts to produce the desired mass of molten metal which thereupon melts the plug or gate and drops through the sprue passage 24 into the mold cavity 25 in which a terminal of the conductor is positioned, thus filling said cavity and upon cooling provides a solid bond terminal. In dropping down the passage, the molten metal is initially directed by the inclined wall of the passage against the exposed face of the rail, so as to insure proper heating thereof and the proper union of such bond terminal therewith.

It will be understood that the volume of molten metal produced by the charge in the crucible is gauged so as to fill the mold cavity 25. Any slight excess of metal, together with the slag which is produced by the reaction, and will normally float on the molten metal, remains in the sprue passage 24 which is made relatively large for this purpose. By reason of the constricted character of the connection between the sprue passage and the mold cavity, the residue of metal and/or slag which remains in such passage will, after the operation is complete and the mold has been taken away, be definitely marked off from the cast terminal and may be readily removed.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. A device for cast welding a rail bond conductor to a rail comprising two molds with cavities open on one side, a frame holding said molds in such spacial relationship that the respective ends of a conductor may be positioned in said cavities, a fulcrum arm attached to said frame, a second fulcrum arm adapted at its lower end to engage the side of the railhead opposite to that engaged by said molds, means pivotally connecting said fulcrum arms intermedially of their ends and means associated with the upper ends of said fulcrum arms for forcing the same apart and thus urging their lower ends toward each other and so clamping said molds against said rail.

2. In apparatus of the character described, the combination of a pair of molds provided with cavities on their respective rail-engaging faces and respectively adapted to support the opposite ends of a rail bond conductor in said cavities adjacent a rail face, a fulcrum arm having laterally extending projections at its lower end, means respectively resiliently connecting said molds to said lateral extensions, a second fulcrum arm provided at its lower end with means for engagement with a face of the rail opposite to that engaged by said molds, means pivotally connecting said fulcrum arms intermediately of their ends and means arranged between the upper ends of said fulcrum arms for urging the same apart and accordingly urging said molds and the lower end of said second-named fulcrum arm into clamping engagement with the rail.

3. The combination with a mold for castwelding the end of a rail bond to a rail, of means for clamping said mold against the face of such rail, said means including two vertically disposed arms pivotally connected intermediately of their ends, means associated with said arms for forcing the lower ends thereof together, the lower end of one of said arms extending beyond the lower end of the other, whereby such first arm end may bear against the side of a rail when the second rests on the top thereof, and a frame attached to such second arm end and adapted to support said mold in position to contact with the opposite side of such rail.

4. The combination with a mold for castwelding the end of a rail bond to a rail, of means for clamping said mold against the face of such rail, said means including two vertically disposed arms pivotally connected intermediately of their ends, means associated with said arms for forcing the lower ends thereof together, the lower end of one of said arms extending beyond the lower end of the other, whereby such first arm end may bear against the side of a rail when the second rests on the top thereof, an adjustable extension for such second arm end, and a frame attached to such second arm end and adapted to support said mold in position to contact with the opposite side of such rail.

5. The combination with a mold for cast-welding the end of a rail bond to a rail, of means for clamping said mold against the face of such rail, said means including two vertically disposed arms pivotally connected intermediately of their ends, means associated with said arms for forcing the lower ends thereof together, the lower end of one of said arms extending beyond the lower end of the other, whereby such first arm end may bear against the side of a rail when the second rests on the top thereof, and a frame attached to such second arm end and adapted to support said mold in position to contact with the opposite side of such rail, said mold being hingedly connected with said frame.

6. The combination with a mold for cast-welding the end of a rail bond to a rail, of means for clamping said mold against the face of such rail, said means including two vertically disposed arms pivotally connected intermediately of their ends, means associated with said arms for forcing the lower ends thereof together, the lower end of one of said arms extending beyond the lower end of the other, whereby such first arm end may bear against the side of a rail when the second rests on the top thereof, a frame attached to such second arm end and adapted to support said mold in position to contact with the opposite side of such rail, said mold being hingedly connected with said frame; and resilient means interposed between said frame and mold.

7. A device for cast welding a rail bond conductor to a rail comprising a mold having a cavity open on one side, a frame adapted to support said mold with such cavity toward the rail, and means for mounting said mold on said frame comprising a rod slidably mounted in said frame normal to the rail and oscillatorily supporting said mold, and resilient means acting on said frame and mold to force said mold toward the rail.

CHAS. A. CADWELL.